(12) United States Patent
Zimmer et al.

(10) Patent No.: US 7,747,846 B2
(45) Date of Patent: Jun. 29, 2010

(54) MANAGED REDUNDANT ENTERPRISE BASIC INPUT/OUTPUT SYSTEM STORE UPDATE

(75) Inventors: Vincent J. Zimmer, Federal Way, WA (US); Mrigank Shekhar, Camas, WA (US); Kushagra Vaid, San Jose, CA (US); Michael A. Rothman, Puyallup, WA (US); Lee Rosenbaum, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 670 days.

(21) Appl. No.: 11/728,454

(22) Filed: Mar. 26, 2007

(65) Prior Publication Data

US 2008/0244249 A1    Oct. 2, 2008

(51) Int. Cl.
*G06F 15/177* (2006.01)

(52) U.S. Cl. .................. 713/1; 713/2; 713/100; 713/155; 713/176

(58) Field of Classification Search ............ 713/1, 713/2, 100
See application file for complete search history.

(56) References Cited

U.S. PATENT DOCUMENTS

| 6,079,016 | A | * | 6/2000 | Park ............................ 713/2 |
| 6,732,267 | B1 | * | 5/2004 | Wu et al. ..................... 713/100 |
| 2004/0153738 | A1 | * | 8/2004 | Otaka et al. ................. 714/6 |
| 2007/0005828 | A1 | * | 1/2007 | Diamant ...................... 710/48 |
| 2007/0260866 | A1 | * | 11/2007 | Wang et al. .................. 713/2 |
| 2008/0126779 | A1 | * | 5/2008 | Smith ........................... 713/2 |
| 2008/0130893 | A1 | * | 6/2008 | Ibrahim et al. ............. 380/277 |

\* cited by examiner

*Primary Examiner*—Nitin C Patel
(74) *Attorney, Agent, or Firm*—Trop, Pruner & Hu, P.C.

(57) ABSTRACT

A basic input/output system may be stored on two different memories coupled to active management technology firmware and a trusted platform module. The trusted platform module ensures that access to the correct memory. One of the memories is selected to store an update of the basic input/output system.

13 Claims, 2 Drawing Sheets

MANAGED REDUNDANT ENTERPRISE BASIC INPUT/OUTPUT SYSTEM STORE UPDATE

BACKGROUND

This relates generally to updating basic input/output systems of platforms.

It is desirable to update platforms from time to time in a networked environment. For example, the basic input/output system of a platform may be updatable.

Unauthorized persons may attempt to change the basic input/output system in order to gain access or to make changes that are improper. Thus, it would be desirable to enable updating of the basic input/output system without providing an opportunity for unscrupulous individuals to improperly modify the basic input/output system.

DETAILED DESCRIPTION

Figure 1:
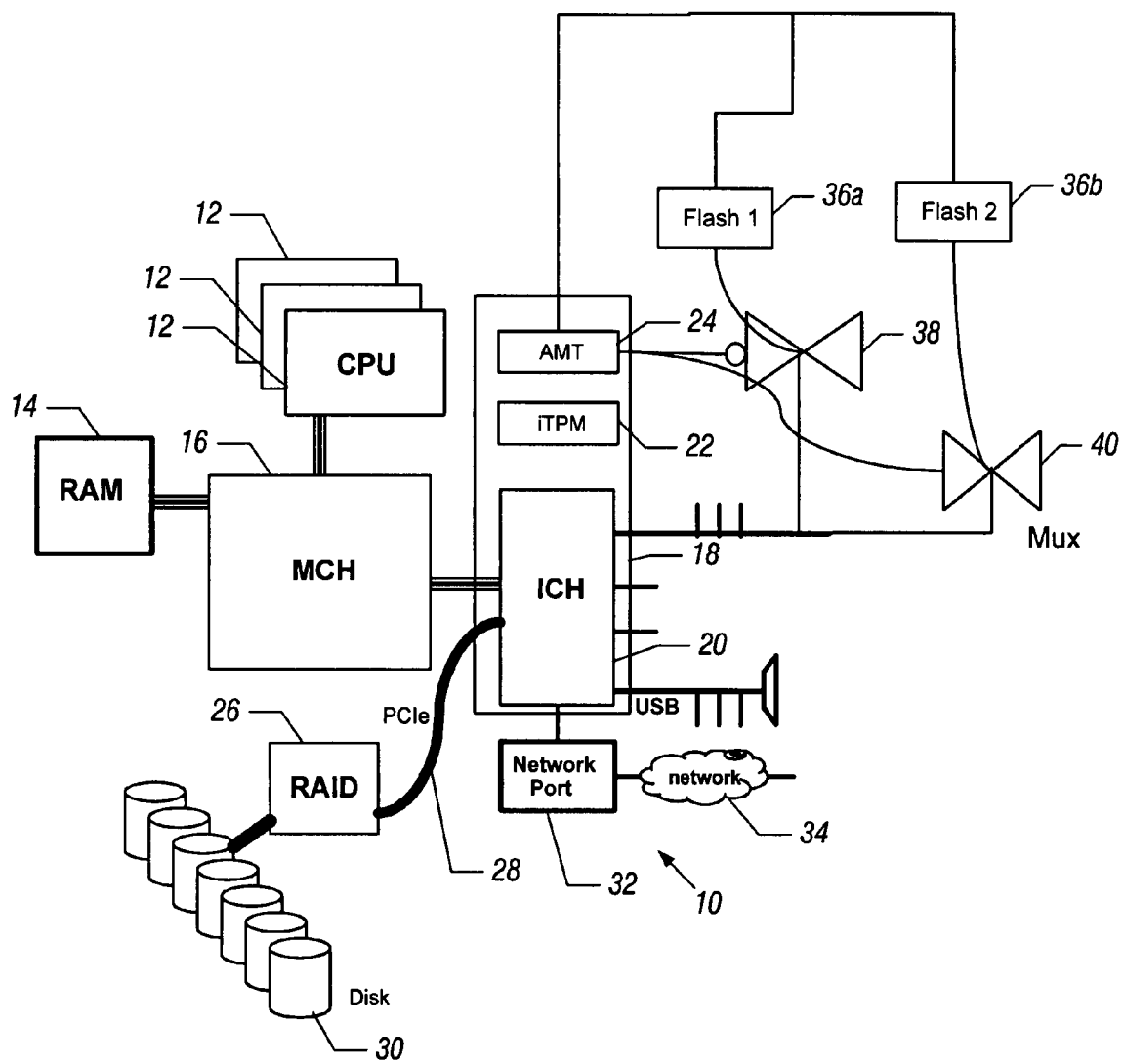
FIG. 1 is a schematic depiction of one embodiment.

Referring to FIG. 1, a system 10 includes one or more processors 12 coupled to a memory control hub 16 in one possible architecture. The memory control hub 16 may be coupled to a random access memory 14 and an intermediate control hub 20. The intermediate control hub 20 is coupled to a network port 32. The hub 20 may be part of a manageability engine 18 that also includes a trusted platform module (TPM) 22 (See TPM Specification, 1.2 Revision 94, published on Mar. 29, 2006 by the Trusted Computing Group) which may be implemented in the form of a memory and an active management technology firmware 24. See Intel® Active Management Technology Deployment and Reference Guide, 1.0, October 2006, available from Intel Corporation, Santa Clara, Calif.

The hub 18 may be connected to a network port 32 which, in turn, couples to a network 34. The hub 20 may also be coupled by a PCIe bus 28 (See PCIe 2.0 Base Specification, available from the PCI Special Interest Group, Beaverton, Oreg.) to a redundant array of independent disks 26, in turn, coupled to disks 30, in one embodiment.

Coupled to the active management technology firmware 24 may be two separate memories 36a and 36b which may be flash memories, for example. Each memory 36a or 36b is coupled to a multiplexer 38 or 40. The multiplexer 40 couples the memory 36b to the hub 20 and the multiplexer 38 couples the memory 36a to the hub 20 and also to the active management technology firmware 24.

Each of the memories 36a and 36b may have an exact image of a complete basic input/output system. During an online basic input/output system update process, the active management technology firmware 24 may use the multiplexers 38 and 40 to toggle between the two memories 36a and 36b so that one memory is active while the other memory is being updated. This updating may be by in-band or out-of-band code. The out-of-band code may use the active management technology code. The use of two alternating flash memories for an on-line update process may be referred to as rolling BIOS technology. The rolling basic input/output system technology assures that, prior to allowing any block of memory 36 to be exposed to in-band code or have its contents changed, appropriate means are used to ensure that the platform authorized the update.

To this end, any basic input/output system update may need to be signed. The signature verification takes place within the active management technology firmware 24 with a public key that the active management technology firmware owns. The basic input/output system, being updated, does not need to validate basic input/output system software updates itself. Therefore, the basic input/output system need not concern itself with storing the key or how to do out-of-band updates at operating system run time.

The active management technology firmware 24 that processes this capsule update is a signed firmware volume and can be a procedure within the manageability engine 18 trusted platform module 22. The trusted platform module has a microcontroller that stores secured information, generates cryptographic keys, provides the ability to use the keys, and generates random numbers. Thus, the active management technology managed update satisfies the core root of trust for maintenance (CRTM) propounded by the Trusted Computing Group (TCG) Specification.

When invoking the update, the information can either be passed through the in-band interface to the manageability engine 18, such as a host embedded controller interface (HECI), or through an out-of-band access. The in-band application program interface (API) to the operating system for the update can include, but is not limited to, Unified Extensible Firmware Interface (UEFI) Specification 2.0 (available from the Unified EFI Forum Administration, Beaverton, Oreg. 97006) capsule update process.

Figure 2:
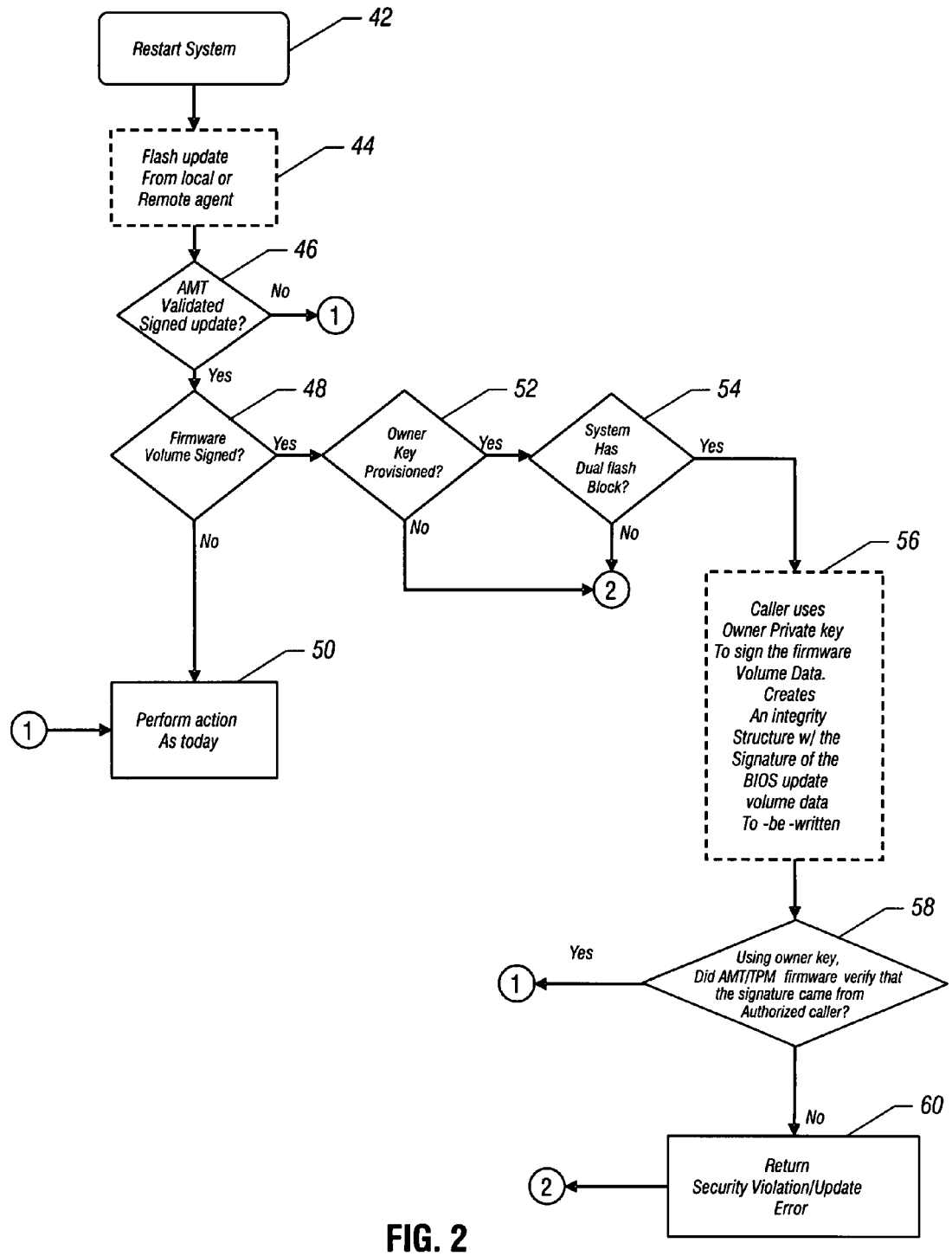
FIG. 2 is a flow chart for another embodiment of the present invention.

Referring to FIG. 2, when the system restarts, as indicated at block 42, a basic input/output system update from a remote or local agent may be recognized as indicated at dotted block 44. A check at diamond 46 determines whether the active management technology has validated the update as being a signed update. If so, a check at diamond 48 determines whether the firmware volume is signed. If so, a check at diamond 52 determines whether the owner key has been provided. If so, the check at diamond 54 determines whether the system has a dual memory block. If so, the caller uses the owner private key to sign the firmware volume data (block 56). An integrity structure with the signature of the basic input/output system update volume data to be written is created. If the firmware is not signed, a conventional sequence is used (block 50).

The caller also creates an integrity structure with the signature of the basic input/output system update volume data to be written. A check at diamond 58 determines whether, using the owner key, did the active management technology trusted platform module firmware verify that the signature came from an authorized caller. If not, a security violation is returned, as indicated in block 60.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A non-transitory computer readable medium storing instructions that, if executed, enable a computer to:
   receive a basic input/output system update;
   select one of two possible memories to update a basic input/output system, both of said memories storing identical images of the basic input/output system; and
   use a trusted platform module and active management technology firmware to ensure access to the selected memory, by verifying a signature associated with the update using a public key owned by the active management technology.

2. The medium of claim 1 storing instructions to use active management technology firmware to select between two memories to store a basic input/output system update.

3. The medium of claim 2 storing instructions to maintain an undisturbed copy of the basic input/output system on one of said memories.

4. The medium of claim 3 storing instructions to verify the signature associated with a basic input/output system update.

5. The medium of claim 4 further storing instructions to implement the signature verification within the active management technology firmware.

6. The medium of claim 5 further storing instructions to ensure that the owner of the system authorized the basic input/output system update by requiring an owner key.

7. A system comprising:
   a processor;
   a trusted platform module coupled to said processor;
   two memories, coupled to said processor, storing complete copies of a basic input/output system;
   active management technology firmware storing complete copies of a basic input/output system; and
   said processor to select one of said memories to update the basic input/output system, said trusted platform module to ensure that access to the selected memory, by verifying a signature associated with the update using a public key owned by the active management technology.

8. The system of claim 7, said active management technology firmware to select between said two memories.

9. The system of claim 8, said processor to maintain an undisturbed copy of the basic input/output system on one of said memories.

10. The system of claim 9, said trusted platform module to verify the signature associated with a basic input/output system update.

11. The system of claim 10, said active management technology firmware to implement said signature verification.

12. The system of claim 11, said processor to ensure that the owner of the system authorized the basic input/output system update by requiring an owner key.

13. The system of claim 12 wherein said memories are flash memories.

* * * * *